United States Patent
Mok et al.

(10) Patent No.: US 11,272,263 B2
(45) Date of Patent: Mar. 8, 2022

(54) ELECTRONIC APPARATUS, CONTROL METHOD OF ELECTRONIC APPARATUS, AND RECORDING MEDIUM

(71) Applicant: SAMSUNG ELECTRONICS CO., LTD., Suwon-si (KR)

(72) Inventors: Tae-yang Mok, Suwon-si (KR); Nam-Jae Jeon, Seoul (KR); Hak-bong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 16/464,904

(22) PCT Filed: Nov. 16, 2017

(86) PCT No.: PCT/KR2017/013028
§ 371 (c)(1),
(2) Date: May 29, 2019

(87) PCT Pub. No.: WO2018/101656
PCT Pub. Date: Jun. 7, 2018

(65) Prior Publication Data
US 2019/0289371 A1    Sep. 19, 2019

(30) Foreign Application Priority Data
Nov. 29, 2016  (KR) .......................... 10-2016-0160730

(51) Int. Cl.
*H04N 21/8355*  (2011.01)
*H04N 21/436*  (2011.01)
(Continued)

(52) U.S. Cl.
CPC ......... *H04N 21/8355* (2013.01); *G06F 16/00* (2019.01); *G06F 16/113* (2019.01);
(Continued)

(58) Field of Classification Search
CPC .......... H04N 21/4122; H04N 21/4333; H04N 21/47217; H04N 21/6587; H04N 21/4325;
(Continued)

(56) References Cited

U.S. PATENT DOCUMENTS

| | | | | |
|---|---|---|---|---|
| 5,883,621 A | * | 3/1999 | Iwamura | .......... H04N 21/42204 |
| | | | | 725/37 |
| 2001/0007568 A1 | * | 7/2001 | Morris | ............... G11B 27/3027 |
| | | | | 370/473 |

(Continued)

FOREIGN PATENT DOCUMENTS

| | | |
|---|---|---|
| KR | 10-2006-0108204 A | 10/2006 |
| KR | 10-0760534 B1 | 9/2007 |

(Continued)

OTHER PUBLICATIONS

International Search Report (PCT/ISA/210) dated Mar. 29, 2018 issued by the International Searching Authority in International Application No. PCT/KR2017/013028.

*Primary Examiner* — Jason Salce
(74) *Attorney, Agent, or Firm* — Sughrue Mion, PLLC

(57) ABSTRACT

Provided is an electronic apparatus including: at least one communicator configured to communicate with a first external apparatus and a second external apparatus; and a processor configured to receive a request for writing a file on the second external apparatus from the first external apparatus, receive the file from the first external apparatus based on a filename format of the file, writing of which is permitted, and make the received file be selectively stored in the second external apparatus.

10 Claims, 9 Drawing Sheets

(51) Int. Cl.
*G06F 21/12* (2013.01)
*G06F 21/64* (2013.01)
*G06F 16/00* (2019.01)
*G06F 16/11* (2019.01)
*G06F 16/16* (2019.01)

(52) U.S. Cl.
CPC .......... *G06F 16/162* (2019.01); *G06F 21/123* (2013.01); *G06F 21/64* (2013.01); *H04N 21/43615* (2013.01); *H04N 21/43622* (2013.01)

(58) Field of Classification Search
CPC ........... H04N 21/232; H04N 21/42646; H04N 21/42661; H04N 21/4334
See application file for complete search history.

(56) References Cited

U.S. PATENT DOCUMENTS

| | | | | |
|---|---|---|---|---|
| 2001/0043272 | A1* | 11/2001 | Sato | H04N 5/23299 348/211.6 |
| 2003/0028761 | A1* | 2/2003 | Platt | G11B 27/005 713/150 |
| 2003/0110503 | A1* | 6/2003 | Perkes | H04N 21/84 725/86 |
| 2004/0250086 | A1* | 12/2004 | Maucher | G06F 21/64 713/187 |
| 2005/0066048 | A1* | 3/2005 | Young | H04N 21/2543 709/231 |
| 2005/0228859 | A1* | 10/2005 | Maeda | H04N 21/4143 709/203 |
| 2005/0281540 | A1* | 12/2005 | Inokuchi | G11B 20/0021 386/232 |
| 2007/0130433 | A1* | 6/2007 | Safa | G06F 21/52 711/163 |
| 2009/0013408 | A1* | 1/2009 | Schipka | H04L 63/145 726/24 |
| 2010/0185705 | A1* | 7/2010 | Bansal | G06F 16/1847 707/822 |
| 2010/0250704 | A1* | 9/2010 | Kittel | H04L 67/104 709/219 |
| 2010/0306859 | A1* | 12/2010 | Risan | G11B 20/00869 726/32 |
| 2011/0219229 | A1 | 9/2011 | Cholas et al. | |
| 2012/0023253 | A1* | 1/2012 | Rhyu | H04L 65/4069 709/231 |
| 2014/0067881 | A1 | 3/2014 | Jung et al. | |
| 2017/0131926 | A1* | 5/2017 | Kayama | G06F 21/6218 |
| 2018/0373877 | A1* | 12/2018 | Bruso | G06F 21/78 |

FOREIGN PATENT DOCUMENTS

| | | |
|---|---|---|
| KR | 10-1130475 B1 | 3/2012 |
| KR | 10-1265533 B1 | 5/2013 |
| KR | 10-2014-0031510 A | 3/2014 |
| KR | 10-2014-0043621 A | 4/2014 |

* cited by examiner

ELECTRONIC APPARATUS, CONTROL METHOD OF ELECTRONIC APPARATUS, AND RECORDING MEDIUM

TECHNICAL FIELD

The disclosure relates to an electronic apparatus capable of transmitting and receiving a multimedia file to and from another apparatus through network communication or reproducing the multimedia file, a control method of the electronic apparatus, and a recording medium, and more particularly to an electronic apparatus, a control method of the electronic apparatus, and a recording medium, in which a writing command received from another apparatus is improved in security while making an interface for streaming a multimedia file stored in a separate external apparatus to the apparatus that transmits the writing command.

BACKGROUND ART

To calculate and process predetermined information according to a specific process, an electronic apparatus basically including electronic parts such as a central processing unit (CPU) for calculation, a chipset, a memory, and the like may be classified into various types depending on what is the information to be subjected to the process or what is the purpose of use. For example, the electronic apparatus is classified into information processing apparatus such as a personal computer (PC), a server, and the like to process universal information; a video processing apparatus to process video information; audio processing apparatus to process audio information; home appliances for miscellaneous household affairs; etc.

Among them, the image processing apparatus receives a content signal including image data from the outside, and processes the image data extracted from the content signal in accordance with various image processing processes. The image processing apparatus displays an image based on the processed image data on its own display panel, or outputs the processed image data to another display apparatus having a display panel so that the corresponding apparatus can display the image. As a representative example of the image processing apparatus having no display panel, there is a set-top box. The image processing apparatus having the display panel is in particular called a display apparatus, and for example includes a TV, a monitor, a portable multimedia player, a tablet computer, a mobile phone, etc.

Such an image processing apparatus may support various extended functions according to convenience in use or development of content as well as a basic function of processing an image. For example, a plurality of image processing apparatuses are connected to each other through a network in accordance with predetermined standards, and link operation is possible in such a manner that multimedia content from a certain image processing apparatus serving as a server is received and reproduced in another image processing apparatus serving as a client through a network. However, when an image processing apparatus transmits not its own content stored therein but content stored in an external apparatus locally connected thereto to another apparatus, the image processing apparatus may additionally include a solution to support of such a function. However, the addition of the solution may cause a problem of a security issue in the image processing apparatus.

DISCLOSURE

Technical Solution

According to an embodiment of the disclosure, there is provided an electronic apparatus including: at least one communicator configured to communicate with a first external apparatus and a second external apparatus; and a processor configured to receive a request for writing a file on the second external apparatus from the first external apparatus, receive the file from the first external apparatus based on a filename format of the file, writing of which is permitted, and make the received file be selectively stored in the second external apparatus. Thus, the electronic apparatus prevents the first external apparatus from recording a file, which is not permitted in the previously defined standards, in the second external apparatus, thereby preventing a problem of security.

Here, the processor may be configured to receive the file based on an extension of the file, the writing of which is permitted, but prevent the file from being received based on an extension of the file, the writing of which is not permitted.

Here, the electronic apparatus may further include a database to define extensions of which the writing is permitted, wherein the processor is configured to identify whether the file includes the extension, the writing of which is permitted, by searching the database.

Further, the processor may be configured to check validity of the received file, store the file passed the validity check in the second external apparatus, and delete the file failed to pass the validity check not to be stored in the second external apparatus. Thus, the electronic apparatus prevents the file with the forged extension from being received from the first external apparatus.

Here, the processor may be configured to analyze a format of the received file based on a header of the received file, and identify failure to pass the validity check based on a mismatch between a result of the analysis and the extension of the file.

Further, the processor may be configured to: receive a part of the file including a header from the first external apparatus based on the filename format of the file the writing of which is permitted, and check the validity of the file based on the header, and receive the other part of the file from the first external apparatus based on the file passed the validity check, but delete the previously received part of the file based on the file filed to pass the validity check. Thus, the electronic apparatus may first receive and identify only the minimum data for the validity check of the file, thereby preventing wasteful use of the network.

Further, the processor may be configured to selectively identify the filename format of the file, based on whether an account of the first external apparatus has writing authority, in response to a writing request of the file received from the first external apparatus.

Further, the at least one communicator may include a first communicator configured to communicate with the first external apparatus based on a first transmission standard, and a second communicator configured to communicate with the second external apparatus based on a second transmission standard, and the processor may be configured to obtain a file corresponding to a request from the second external apparatus through the second communicator, based on the request for the file stored in the second external apparatus received from the first external apparatus through the first communicator, and transmit the obtained file through the first communicator.

Here, the processor may be configured to transmit apparatus information about the first external apparatus to the first external apparatus, based on a broadcasting signal according to the first transmission standard received from the first external apparatus through the communicator, and process network communication according to the first transmission standard to be enabled between the communicator and the first external apparatus based on the apparatus information received from the first external apparatus.

Further, according to an embodiment of the disclosure, there is provided a method of controlling an electronic apparatus, including: communicating with a first external apparatus and a second external apparatus; receiving a request for writing a file on the second external apparatus from the first external apparatus; receiving the file from the first external apparatus based on a filename format of the file, writing of which is permitted; and making the received file be selectively stored in the second external apparatus.

Here, the receiving of the file may include receiving the file based on an extension of the file, the writing of which is permitted, but preventing the file from being received based on an extension of the file, the writing of which is not permitted.

Here, the receiving of the file may include identifying whether the file includes the extension, the writing of which is permitted, by searching the database configured to define extensions of which the writing is permitted.

Further, the selectively storing may include: checking validity of the received file; storing the file passed the validity check in the second external apparatus; and deleting the file failed to pass the validity check not to be stored in the second external apparatus.

Here, the checking may include analyzing a format of the received file based on a header of the received file, and identifying failure to pass the validity check based on a mismatch between a result of the analysis and the extension of the file.

Further, the receiving of the file may include: receiving a part of the file including a header from the first external apparatus based on the filename format of the file the writing of which is permitted, and checking the validity of the file based on the header, and receiving the other part of the file from the first external apparatus based on the file passed the validity check, but deleting the previously received part of the file based on the file filed to pass the validity check.

Further, the receiving may include selectively identifying the filename format of the file, based on whether an account of the first external apparatus has writing authority, based on a writing request of the file received from the first external apparatus.

Further, according to an embodiment of the disclosure, there is provided a nonvolatile recording medium recorded with a program code of a method executable by a processor of an electronic apparatus, the method including: communicating with a first external apparatus and a second external apparatus; receiving a request for writing a file on the second external apparatus from the first external apparatus; receiving the file from the first external apparatus based on a filename format of the file, writing of which is permitted; and making the received file be selectively stored in the second external apparatus.

BEST MODE

Below, embodiments of the disclosure will be described in detail with reference to accompanying drawings. In the following descriptions of the embodiments, the matters illustrated in the accompanying drawings will be referred. Further, in the embodiments, the components having the direct relation and the concept of the disclosure only will be described, and the description about remaining components except for this will be omitted. However, it will be understood that such omitted components are not unnecessary in terms of realizing an apparatus or system to which the concept of the disclosure is applied.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure. Further, the embodiments described with reference to the accompanying drawings are not exclusive to each other unless otherwise mentioned, and a plurality of embodiments may be selectively combined within one apparatus. The combination of these embodiments may be discretionally selected and applied to realize the present inventive concept by a person having an ordinary skill in the art.

Figure 1:
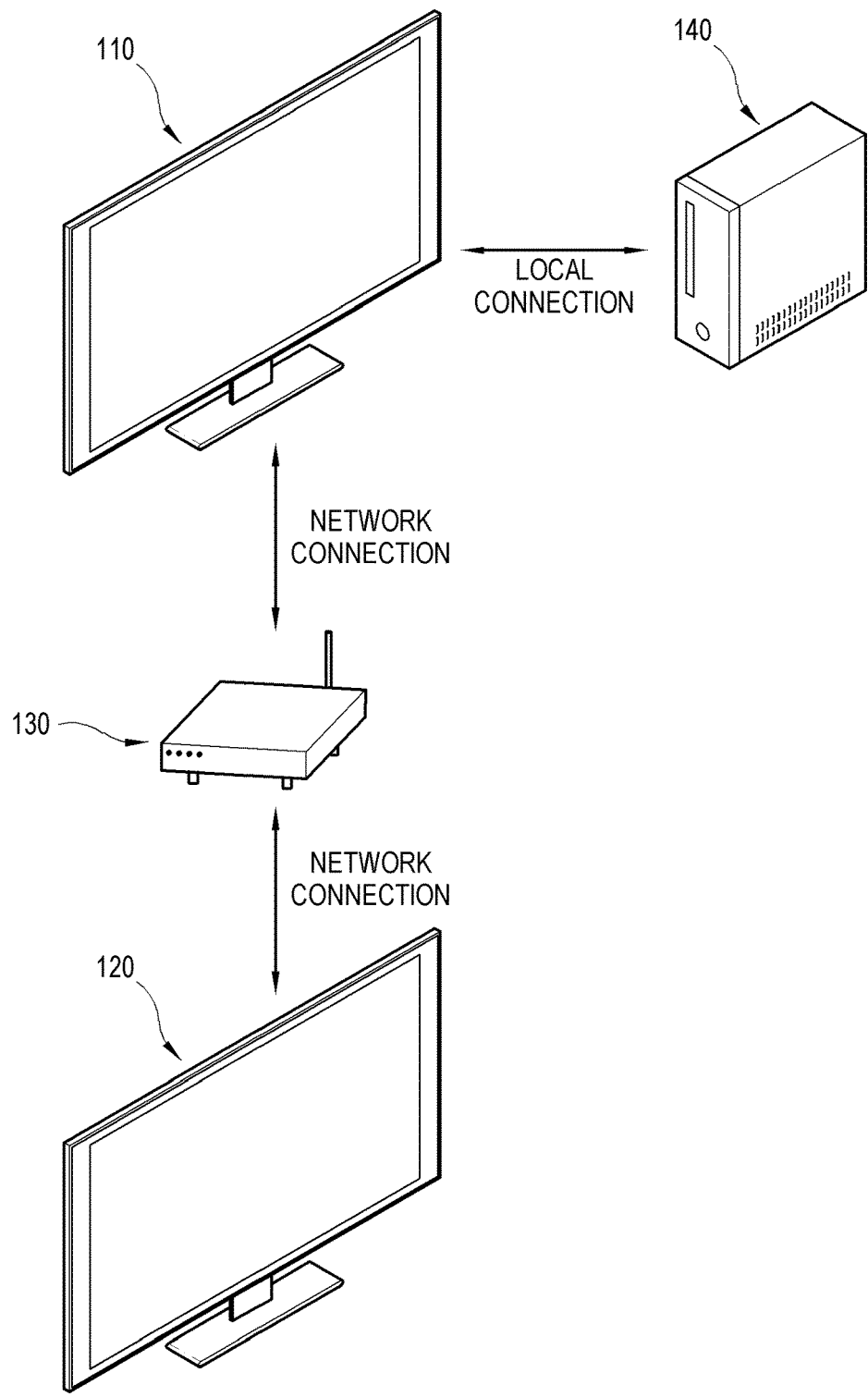
FIG. 1 illustrates an example of a system according to an embodiment of the disclosure.

FIG. 1 illustrates an example of a system according to an embodiment of the disclosure.

As shown in FIG. 1, the system according to this embodiment includes a plurality of image processing apparatuses 110 and 120 which connect and communicate with each other through a network. In this embodiment, a first image processing apparatus 110 and a second image processing apparatus 120 are all actualized by a TV. However, the TV is merely one example of the apparatuses that can be actualized according to the concept of the disclosure. The apparatus of the system may be actualized by various electronic apparatuses such as an image processing apparatus, a display apparatus, a home appliance, etc.

In this embodiment, it will be described that two apparatuses, i.e. The first image processing apparatus 110 and the second image processing apparatus 120 are connected to each other for communication through a hub 130. However, the system actualized according to the concept of the disclosure may not be limited to this embodiment but extend. For example, even though the system includes three or more image processing apparatuses, this embodiment may be applied to data exchange between two image processing apparatuses. Further, the hub 130 or a wireless network using an access point (AP) or the like relay may be constructed between the first image processing apparatus 110 and the second image processing apparatus 120, or the first image processing apparatus 110 and the second image processing apparatus 120 may directly communicate with each other without the hub 130 or the like relay device.

Besides the communication with the second image processing apparatus 120 through the network, the first image processing apparatus 110 may locally connect with a storage apparatus 140. For example, when the storage apparatus 140 is provided to exchange data with the first image processing apparatus 110 through a cable based on a universal serial bus (USB), serial advanced technology attachment (SATA), or the like standards, it is regarded that the storage apparatus 140 is locally connected to the first image processing apparatus 110. The storage apparatus 140 may be actualized by an external hard disk drive (HDD) apparatus, an external flash memory storage apparatus, or an optical media play apparatus, etc.

With this structure, it will be taken into account that the second image processing apparatus 120 receives a data file stored in the storage apparatus 140 like streaming of a multimedia file.

When the storage apparatus 140 is an apparatus accessible to a network, the storage apparatus 140 may transmit a file to the second image processing apparatus 120 through the network. However, to access the network, the storage apparatus 140 has to include a communication module, a communication chip or the like supporting a network protocol and communicating with the hub 130 or the second image processing apparatus 120. However, when the storage apparatus 140 does not include such a communication module and the storage apparatus 140 does not support a network access, it is impossible for the storage apparatus 140 to directly transmit a file to the second image processing apparatus 120. Further, the same circumstance may occur when the protocols supported by the storage apparatus 140 and the second image processing apparatus 120 have nothing in common with each other even though the storage apparatus 140 supports a network access of a certain protocol.

Under such a circumstance, to transmit a file from the storage apparatus 140 to the second image processing apparatus 120, the first image processing apparatus 110 obtains the file from the storage apparatus 140, and transmits the obtained file to the second image processing apparatus 120 through the network. This means that the first image processing apparatus 110 functions as a server in the system. Thus, the first image processing apparatus 110 may additionally include a hardware or software solution suitable for the role of the server, thereby performing the corresponding role.

However, when the first image processing apparatus 110 includes a solution for serving as the server, a problem of security may arise in the first image processing apparatus 110 because of the solution. For example, the first image processing apparatus 110 may receive a writing command related to a malignant file from the second image processing apparatus 120 serving as a client. According to this embodiment, the first image processing apparatus 110 copes with such a command to ensure security. In this regard, descriptions will be made below.

Below, operation that the first image processing apparatus of the related art accesses the storage apparatus through the network, and the first image processing apparatus makes a request for a file to the storage apparatus will be described.

Figure 2:
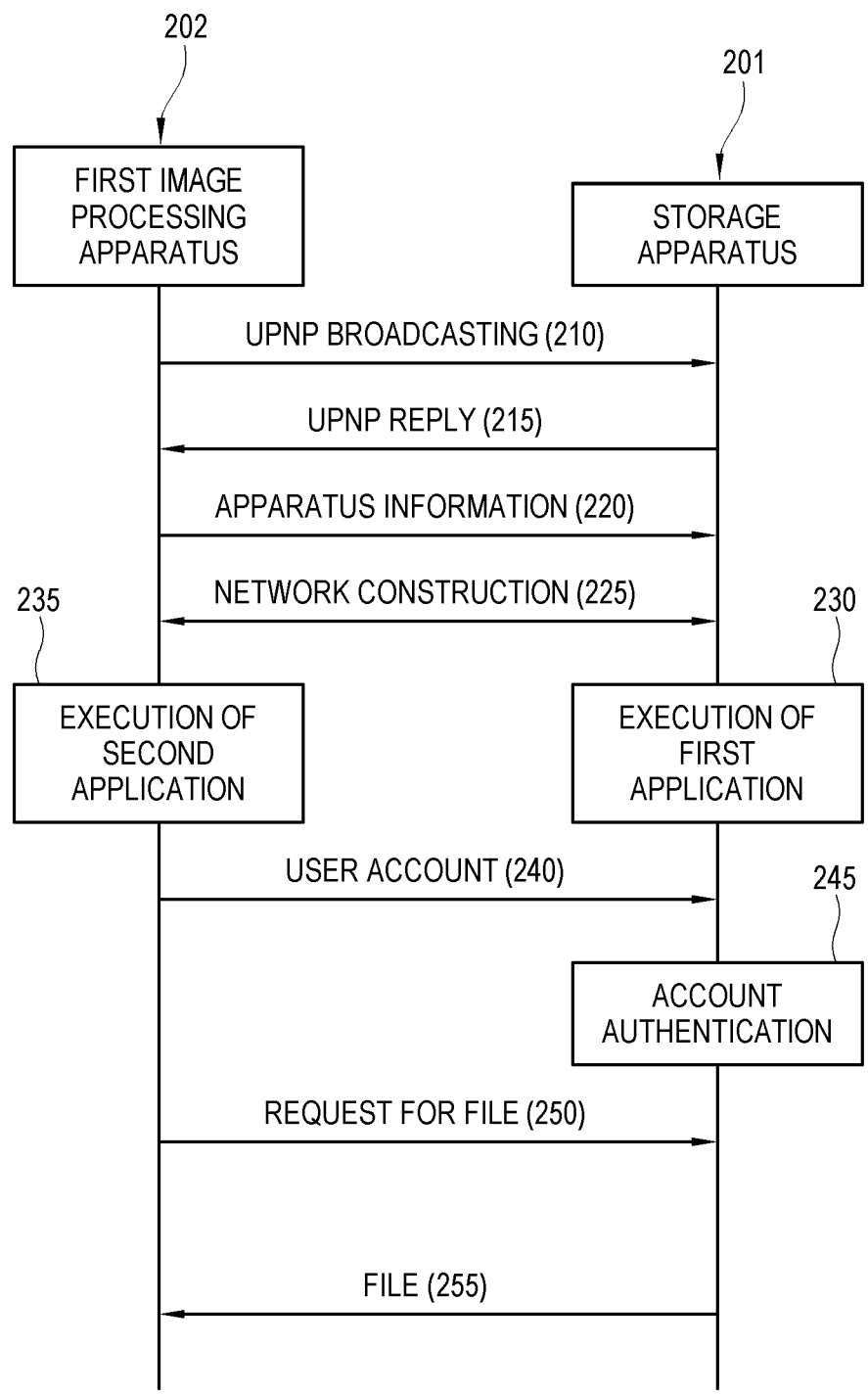
FIG. 2 illustrates an example of a process where a first image processing apparatus of the related art accesses a storage apparatus through a network, and receives a file from the storage apparatus.

FIG. 2 illustrates an example of a process where a first image processing apparatus of the related art accesses a storage apparatus through a network, and receives a file from the storage apparatus.

As shown in FIG. 2, a storage apparatus 201 and a first image processing apparatus 202 in a system according to the related art may construct a network based on one protocol, which is supported in common in between, among various communication protocols. In this embodiment, a universal plug and play (UPnP) method will be given by way of example. However, the method of constructing the network is not limited to the UPnP.

At operation 210, the first image processing apparatus 202 performs UPnP broadcasting. The first image processing apparatus 202 broadcasts a discovery signal within the system and thus searches for an apparatus with which communication is possible.

At operation 215, the storage apparatus 201 detects the signal broadcasted from the first image processing apparatus 202, and performs UPnP reply in response to the detected signal. The reply may include a request for apparatus information or the like of the first image processing apparatus 202 for a UPnP network.

At operation 220, the first image processing apparatus 202 transmits the apparatus information of the first image processing apparatus 202 to the storage apparatus 201 in response to the request.

At operation 225, the storage apparatus 201, together with the first image processing apparatus 202, forms a network path based on the information from the first image processing apparatus 202. Thus, the storage apparatus 201 connects and communicates with the first image processing apparatus 202 through the UPnP network.

At operation 230, the storage apparatus 201 executes a first application for a process to transmit a file of a storage apparatus 203.

At operation 235, the first image processing apparatus 202 executes a second application for a process to receive the file of the storage apparatus 203. The first application and the second application refer to applications provided corresponding to each other, and thus are respectively executed in the apparatuses to transmit/receive and reproduce the multimedia file according to certain standards. For example, when there is a multimedia file, of which transmission/reception or reproduction is restricted for security, the storage apparatus 201 may use the first application to obtain and receive the file of corresponding standards and the first image processing apparatus 202 may use the second application to receive and reproduce the corresponding file.

At operation 240, the first image processing apparatus 202 transmits user account information to the storage apparatus 201.

At operation 245, the storage apparatus 201 authenticates the corresponding account. Thus, the first image processing apparatus 202 acquires authority to receive the file from the storage apparatus 201.

At operation 250, the first image processing apparatus 202 make a request for transmission of the file stored in the storage apparatus 201.

At operation 260, the storage apparatus 201 transmits the file corresponding to the request to the first image processing apparatus 202.

Such operation is possible when the storage apparatus 201 supports the network communication function. On the other hand, it is difficult to implement such operation when the storage apparatus 201 does not support the network communication but supports only a local access function.

Below, it will be described that a first image processing apparatus and a second image processing apparatus are connected to each other through a network, and the first image processing apparatus transmits a file from a locally connected storage apparatus to the second image processing apparatus.

Figure 3:
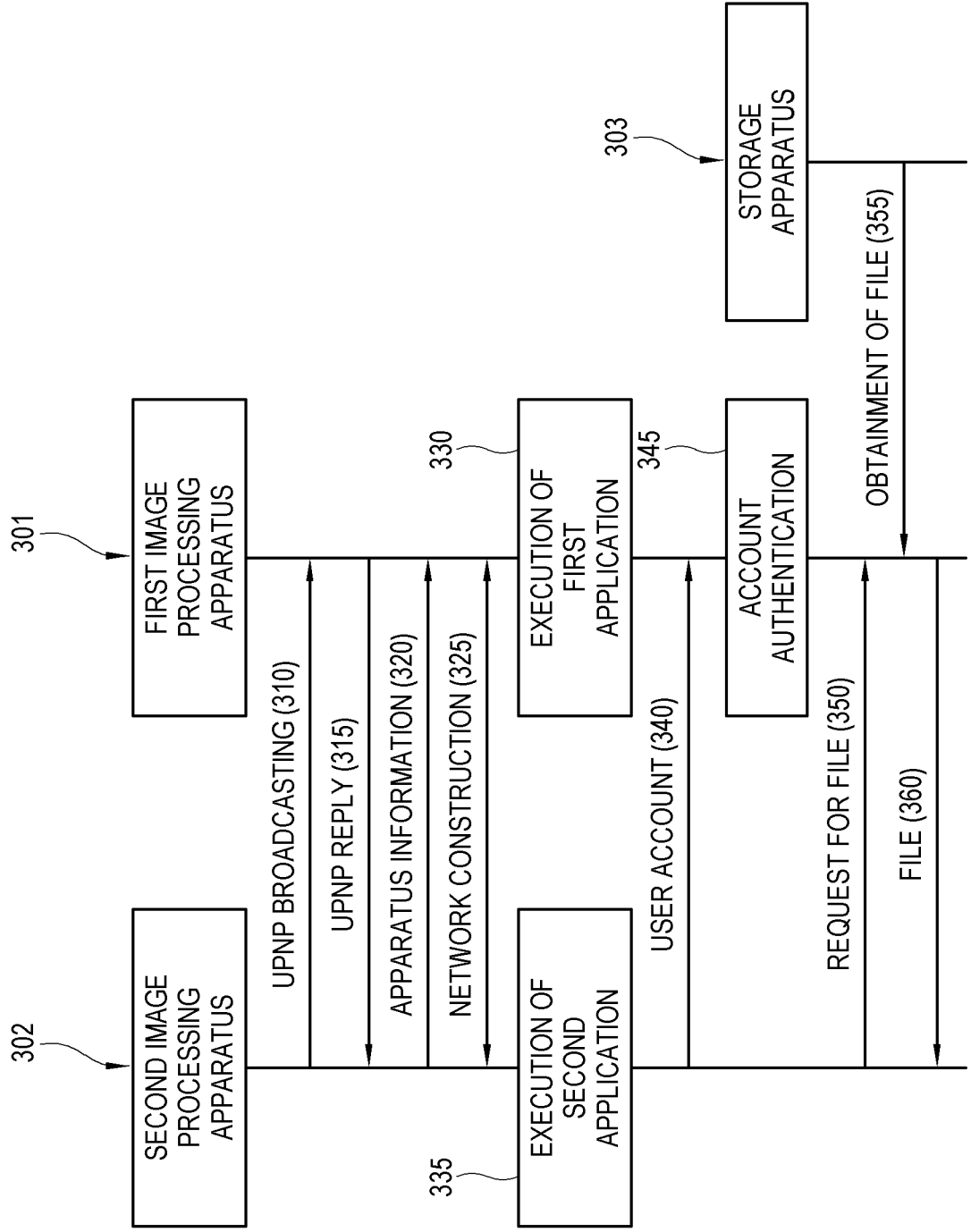
FIG. 3 illustrates an example that a first image processing apparatus according to an embodiment of the disclosure accesses a second image processing apparatus through a network, and transmits a file of a storage apparatus to the second image processing apparatus.

FIG. 3 illustrates an example that a first image processing apparatus according to an embodiment of the disclosure accesses a second image processing apparatus through a network, and transmits a file of a storage apparatus to the second image processing apparatus.

As shown in FIG. 3, a first image processing apparatus 301 and a second image processing apparatus 302 in a system may construct a network based on one protocol, which is supported in common in between, among various communication protocols. In this embodiment, a UPnP method will be given by way of example. However, the method of constructing the network is not limited to the UPnP.

At operation 310, the second image processing apparatus 302 performs UPnP broadcasting.

At operation 315, the first image processing apparatus 301 detects a signal broadcasted from the second image processing apparatus 302, and performs UPnP reply in response to the detected signal.

At operation 320, the second image processing apparatus 302 transmits apparatus information of the second image processing apparatus 302 to the first image processing apparatus 301 in response to the request.

At operation 325, the first image processing apparatus 301 together with the second image processing apparatus 302 forms a network path based on the information from the second image processing apparatus 302. Thus, the first image processing apparatus 301 connects and communicates with the second image processing apparatus 302 through the UPnP network. Meanwhile, a storage apparatus 303 is being locally connected to the first image processing apparatus 301.

At operation 330, the first image processing apparatus 301 executes a first application for a process to transmit a file of the storage apparatus 303. The first application may be executed together with various other processes on an operating system of the first image processing apparatus 301. The features of the first application will be described later.

At operation 335, the second image processing apparatus 302 executes a second application for a process to receive the file of the storage apparatus 303. The first application and the second application refer to applications provided correspondingly to each other, and thus are respectively executed in the apparatuses to transmit/receive and reproduce the multimedia file according to certain standards. For example, when there is a multimedia file, of which transmission/ reception or reproduction is restricted for security, the first image processing apparatus 301 may use the first application to obtain and receive the file of corresponding standards and the second image processing apparatus 302 may use the second application to receive and reproduce the corresponding file.

At operation 340, the second image processing apparatus 302 transmits the user account information to the first image processing apparatus 301.

At operation 345, the first image processing apparatus 301 authenticates the corresponding account. Thus, the second image processing apparatus 302 acquires authority to receive the file from the first image processing apparatus 301.

At operation 350, the second image processing apparatus 302 makes a request for transmission of the file stored in the storage apparatus 303 to the first image processing apparatus 301.

At operation 355, the first image processing apparatus 301 obtains the corresponding file from the storage apparatus 303, in response to the file request from the second image processing apparatus 302. The storage apparatus 303 is being locally connected to the first image processing apparatus 301.

At operation 360, the first image processing apparatus 301 transmits the obtained file to the second image processing apparatus 302 through the UPnP network.

Thus, the second image processing apparatus 302 can receive the file stored in the storage apparatus 303, which is not connected to the UPnP network, through the UPnP network.

With such operation, the first image processing apparatus 301 serves as a server in the system, and the second image processing apparatus 302 serves as a client. The operation of transmitting the file stored in the storage apparatus 303 from the first image processing apparatus 301 to the second image processing apparatus 302 is possible when the account of the second image processing apparatus 302 is authenticated and then the second image processing apparatus 302 has authority to read the file of the storage apparatus 303.

However, when the second image processing apparatus 302 has only the reading authority, it may be impossible or difficult to implement multimedia streaming or the like specific operation. For example, there may be various cases where the second image processing apparatus 302 needs to previously register an account or make an input related to a license for the corresponding content in order to obtain multimedia content. To this end, the second image processing apparatus 302 may need writing authority with regard to the storage apparatus 303. That is, the first image processing apparatus 301 authenticates account information received from the second image processing apparatus 302, and gives writing authority to the second image processing apparatus 302 when the corresponding account is authenticated.

However, when the second image processing apparatus 302 has the writing authority, problems may arise in the system of the related art as follows.

Figure 4:
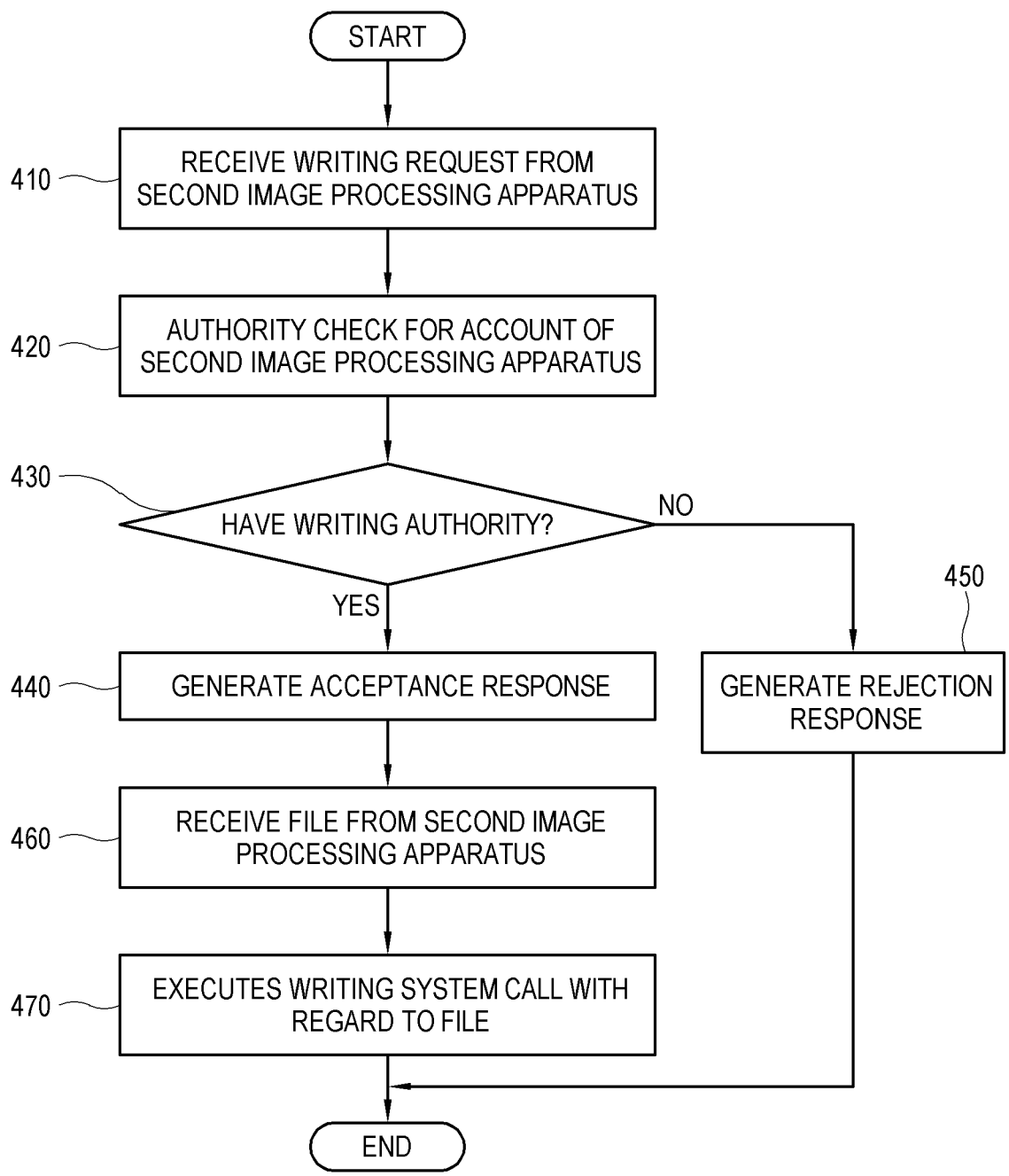
FIG. 4 is a flowchart showing operation when the first image processing apparatus receives a writing request from a second image processing apparatus in a system of the related art.

FIG. 4 is a flowchart showing operation when the first image processing apparatus receives a writing request from a second image processing apparatus in a system of the related art.

As shown in FIG. 4, at operation 410, the first image processing apparatus receives a 'writing request' for a predetermined file from the second image processing apparatus.

At operation 420, the first image processing apparatus checks account authority of the second image processing apparatus that makes the writing request.

At operation 430, the first image processing apparatus identifies whether the second image processing apparatus has the writing authority.

When it is identified that the second image processing apparatus has the writing authority, at operation 440 the first image processing apparatus generates an 'acceptance response'. On the other hand, when it is identified that the second image processing apparatus has no writing authority, at operation 450 the first image processing apparatus generates a 'rejection response'.

At operation 460, the first image processing apparatus receives the file from the second image processing apparatus based on the acceptance response. At operation 470 the first image processing apparatus executes a 'writing system call' with regard to the file received from the second image processing apparatus. Thus, the first image processing apparatus allows the second image processing apparatus having the writing authority to write a predetermined file on the storage apparatus or the first image processing apparatus. Here, descriptions about the system call will be made later.

On the other hand, the first image processing apparatus does not receive the file from the second image processing apparatus based on the rejection response.

Like this, the first image processing apparatus of the related art allows the second image processing apparatus to write any file as long as the second image processing apparatus has the writing authority, and therefore the related art cannot prevent the second image processing apparatus from intentionally writing a file involving a malignant code on the storage apparatus or the first image processing apparatus.

Of course, the foregoing problem is preventable when the first image processing apparatus gives only reading authority without the writing authority to the second image processing apparatus. However, as described above, it may be unavoidable to give the writing authority to the second image processing apparatus.

Thus, according to an embodiment of the disclosure, the second image processing apparatus is prevented from writing a file involving a malignant code on the electronic apparatus even while having the writing authority with regard to the file, and such operation is as follows.

Figure 5:
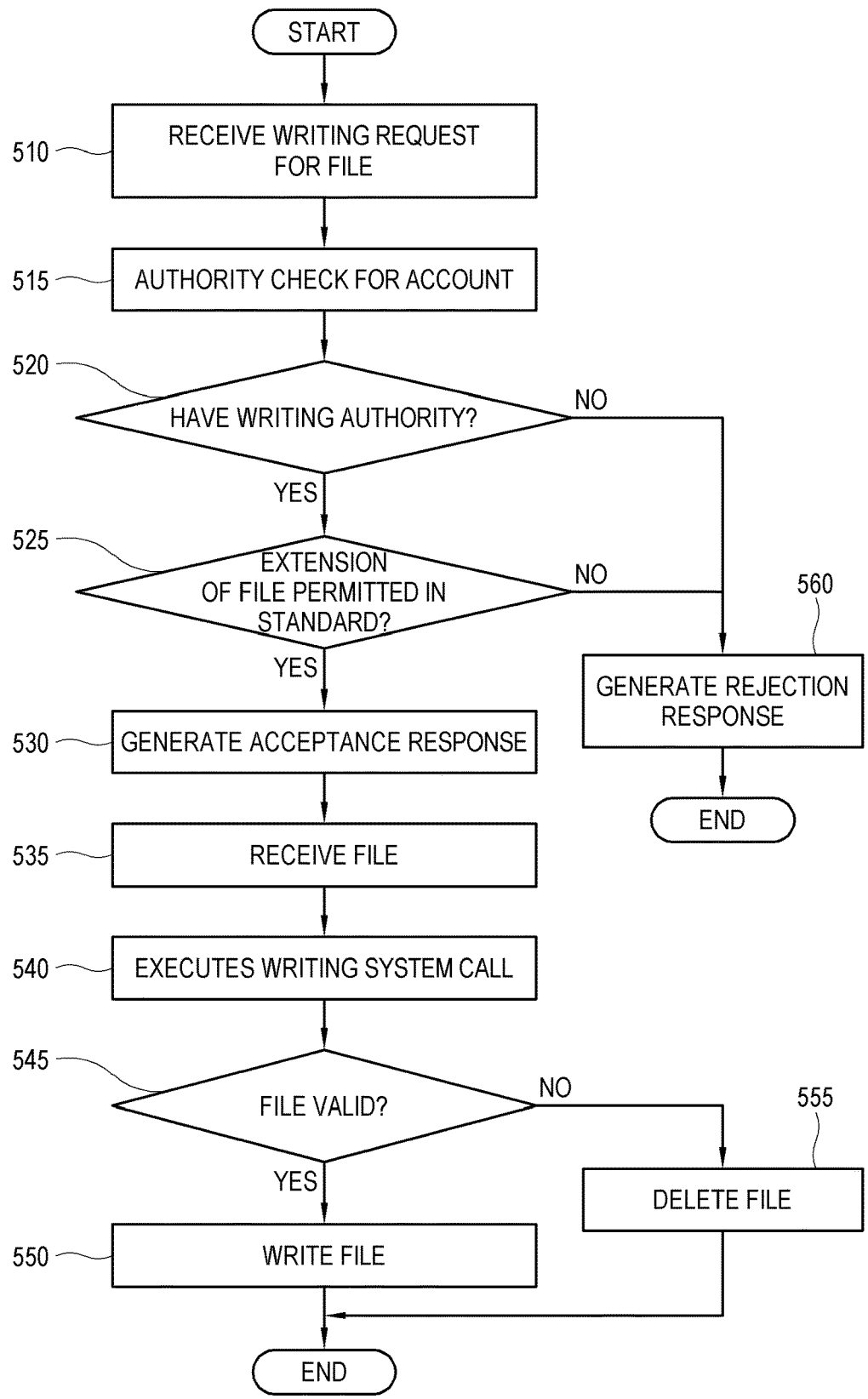
FIG. 5 is a flowchart showing operation when the first image processing apparatus according to an embodiment of the disclosure receives a writing request from the second image processing apparatus in the system.

FIG. 5 is a flowchart showing operation when the first image processing apparatus according to an embodiment of the disclosure receives a writing request from the second image processing apparatus in the system.

As shown in FIG. 5, at operation 510, the first image processing apparatus receives a writing request for a predetermined file from the second image processing apparatus.

At operation 515, the first image processing apparatus checks account authority of the second image processing apparatus.

At operation 520, the first image processing apparatus identifies whether the second image processing apparatus has writing authority.

When it is identified that the second image processing apparatus has the writing authority, at operation 525 the first image processing apparatus identifies whether a filename format of the corresponding file, for example, a filename extension is permitted by a preset standard.

When it is identified that the extension of the file is permitted by the preset standard, at operation 530 the first image processing apparatus generates an acceptance response. The generated acceptance response is transmitted from the first image processing apparatus to the second image processing apparatus.

At operation 535, the first image processing apparatus receives the file from the second image processing apparatus, based on the acceptance response.

At operation 540, the first image processing apparatus executes a writing system call with regard to the received file.

At operation 545, the first image processing apparatus identifies validity of the file.

When it is identified that the file is valid, at operation 550 the first image processing apparatus implements writing of a file based on the writing system call. On the other hand, when it is identified that the file is invalid, at operation 555 the first image processing apparatus deletes the corresponding file.

On the other hand, when it is identified in the operation 520 that the second image processing apparatus has no writing authority or when it is identified in the operation 525 that the extension of the file is not permitted by the preset standard, at operation 560 the first image processing apparatus generates a rejection response. The generated rejection response is transmitted from the first image processing apparatus to the second image processing apparatus, and thus the second image processing apparatus does not transmit the file based on the received rejection response.

Thus, according to an embodiment of the disclosure, the first image processing apparatus identifies whether the extension of the file is permitted in the previously set standard in response to the file writing request from the second image processing apparatus, and allows only the file of the permitted extension to be transmitted. Thus, the first image processing apparatus prevents the file, which is not permitted in the standard, from being received from the second image processing apparatus.

Further, even though the file has a permitted extension, the first image processing apparatus additionally identifies the validity of the file to thereby identify whether the extension of the corresponding file is forged. In other words, although the second image processing apparatus transmits a file involving a malignant code with a forged extension, the file is deleted before it is written.

Thus, the first image processing apparatus prevents the second image processing apparatus having the writing authority from writing a file involving a malignant code on the storage apparatus or the first image processing apparatus, thereby improving security.

Figure 6:
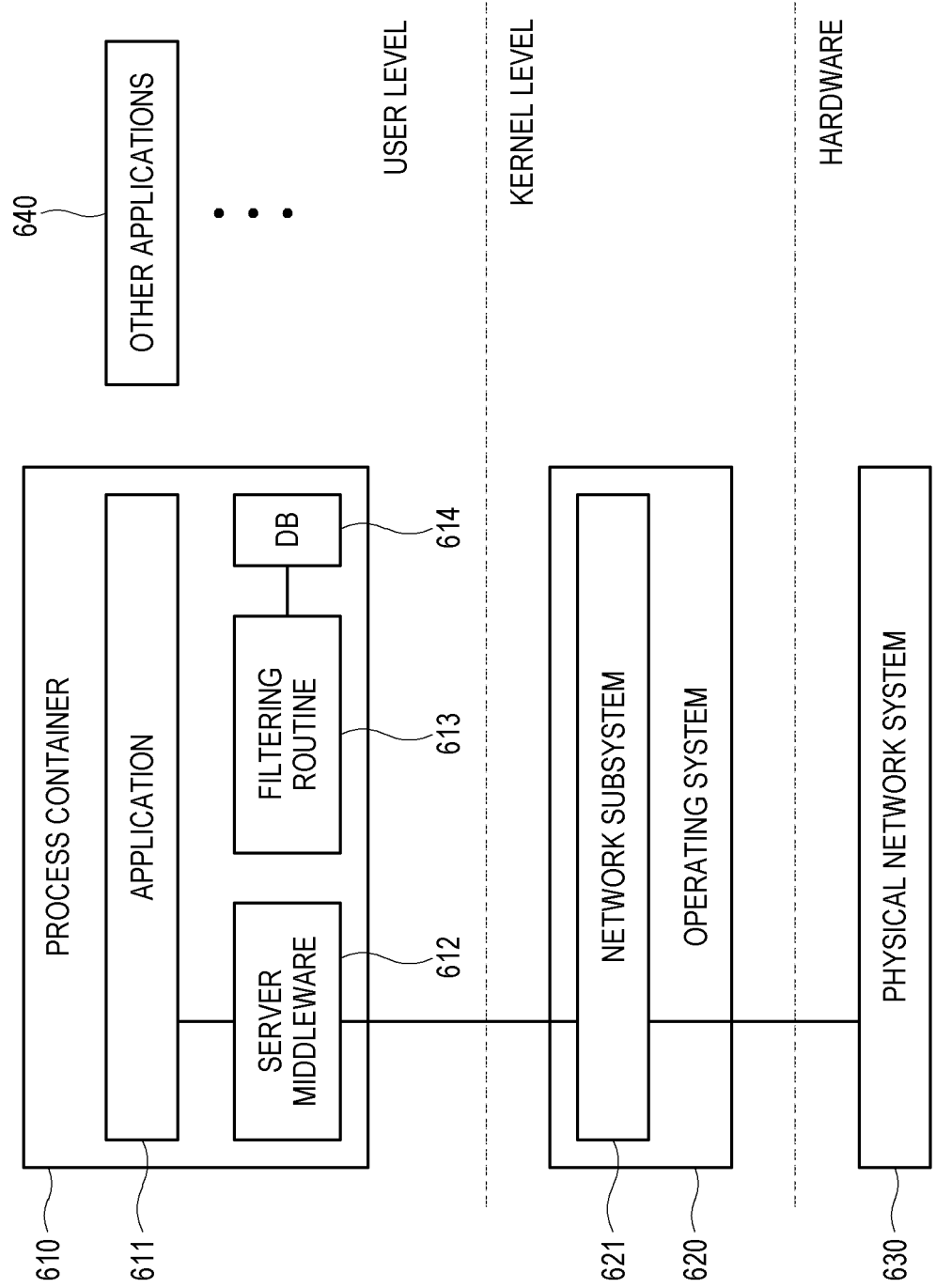
FIG. 6 is a block diagram showing an execution structure of an application executed in the first image processing apparatus according to an embodiment of the disclosure.

FIG. 6 is a block diagram showing an execution structure of an application executed in the first image processing apparatus according to an embodiment of the disclosure.

As shown in FIG. 6, the first image processing apparatus according to this embodiment executes an application 611 based on a protocol in order to implement a process of transmitting a file stored in the storage apparatus to the second image processing apparatus through the network according to the protocol as described above. Below, this process will be called a server process for convenience of description. The application 611 is executed by a processor or central processing unit (CPU) of the first image processing apparatus.

When a level of executing software in the first image processing apparatus is classified into a user level and a kernel level, an operating system 620 is executed in the kernel level and the application 611 is executed in the user level on the operating system 620. In this embodiment, the operating system 620 basically refers to a kernel. The first image processing apparatus supports multitasking and multithreading, and therefore other processes based on various applications may be performed together in addition to the file transmission process.

The operating system 620 refers to system software for implementing the operation of the first image processing apparatus, and includes subsystems respectively corresponding to support functions. The application 611 may obtain a file stored in an electronic apparatus in response to a file request from the second image processing apparatus, transmit the obtained file to the second image processing apparatus through the network, receive a writing request from the second image processing apparatus, and do such commands basically related to the network. Therefore, the application 611 operates on a physical network system 630 and is executed on a network stack or network subsystem 621 for a network function of the operating system 620. The physical network system 630 may for example include a local area network (LAN) card, a communication circuit, and the like communication hardware.

For example, when the writing request is received from the second image processing apparatus, the application 611 identifies whether to permit writing of a file according to the embodiments as described above, and control the writing of the file based on the identification results. In terms of a software structure, the application 611 merely outputs a writing command with regard to the file. To actually perform writing operation with regard to the file, the operating system 620 has to operate by accessing a file system in response to the command. To this end, concept of a system call is required.

The system call refers to an interface for accessing the operating system 620 in response to a request of the application 611, with regard to service provided by the operating system 620. When the application 611 is programmed with a high-level language, the system call is not directly usable, and a high-level application program interface (API) or middleware is designed to act as the system call.

In a typical structure of system software, the operating system 620 of the kernel level and the application 611 of the user level are different in authority of the CPU or accessibility to hardware. The operating system 620 operates at a certain memory location with a linker structure where physical addresses are matched in a flash memory, a random-access memory (RAM) of a CPU system, etc. In this case, all the addresses used in a machine language code of the operating system 620 are compiled as static physical addresses. Therefore, the operating system 620 operates occupying a certain part of the whole memory resources while being booted up, and all interruptions and accesses to hardware are possible.

On the other hand, the application 611 uses resources provided by the operating system 620, and is executed dynamically occupying a memory. The application 611 basically refers to a program executed in response to a user's request, and therefore a physical address thereof is not fixed. The application cannot execute a specific machine language instruction because the authority level of the CPU belongs to the user level.

Under this condition, the application 611 has to use a service of the operating system 620 in order to use a file system, and this method is called a system call. The system call means that a routine of the operating system 620 is called and used for a function not supported in a programming language of the application 611.

Of course, the application 611 may be designed to send the system call to the operating system 620. However, in terms of software design, it is preferable that separate middleware is provided. That is, in terms of software design, it may be easy to add the middleware capable of sending the system call to the operating system 620 in response to the command from the application 611.

The application 611 according to this embodiment is executed on a network sub system 621 of the operating system 620 and executed on server middleware 612 that relays a command between the application 611 and the operating system 620. The server middleware 612 relays a system call corresponding to a command of the application 611 to the operating system 620 so that operation corresponding to the command can be implemented. For example, the server middleware 612 receives a command of writing a certain file from the application 611, and transmits a writing system call to the operating system 620, thereby performing writing operation for the file.

Further, as described above, the server middleware 612 may identify whether the extension of the file is permitted in the protocol supported by the application 611 in response to the writing request of the second image processing apparatus, execute the writing system call, and identify the validity of the file. The server middleware 612 sends the identification results to the application 611 and thus gets an instruction about the subsequent operation.

Taking the operation performed by the server middleware 612 into account, the server middleware 612 is installed in the first image processing apparatus serving as a server in the system, and does not have to be installed in the second image processing apparatus serving as a client. However, the server middleware 612 may be basically installed in both the first image processing apparatus and the second image processing apparatus, and the operation of the server middleware 612 may be varied depending on which one of two apparatuses serves as the server.

Here, the server middleware 612 includes a filtering routine 613 to identify whether the extension of the file is permitted in the standard. In this embodiment, the server middleware 612 and the filtering routine 613 are provided as separate software. Alternatively, the filtering routine 613 may be included in an internal code of the server middleware 612. The filtering routine 613 searches a DB 614 where permitted extensions are defined according to preset standards, and thus identifies whether the extension of the file is permitted to be written. The filtering of the extension will be described later.

On the operating system 620, other processes based on various other applications 640 may be executed together in addition to the application 611, the server middleware 612, the filtering routine 613, and the server process based on the DB 614. Here, the first image processing apparatus configures a process container 610 with software elements of the user level related to the server process, i.e. the application 611, the server middleware 612, the filtering routine 613, and the DB 614 so as to be isolated from other processes.

The process container 610 is configured to isolate the application 611, the server middleware 612, the filtering routine 613, and the DB 614 not to be accessed by other applications 640 executed in the user level. As a solution for achieving the process container 610, Linux containers (LXC) or the like virtualization technique may be used. The LXC or the like container type virtualization technique is to divide a process space of the user level into many spaces, and limit resources in each process space.

Thus, the first image processing apparatus eliminates a possibility that the server process is affected by other processes in the first image processing apparatus.

Meanwhile, the server middleware 612 may use various methods to identify whether a file is valid, in terms of validity check for the file. For example, the server middleware 612 analyzes a header of a file, and identifies whether a format of the file based on analysis results of the header matches the extension of the file. According to a typical structure of a digital file, the file includes a header provided as the first block of data blocks, and a payload or body corresponding to main content of the file. The header has to meet clear or unambiguous requirements for syntactic analysis, and the server middleware 612 analyzes the header to identify the characteristics of the file.

The server middleware 612 identifies that the file is valid when the characteristics of the file identified by the analysis of the header match the extension of the file. On the other hand, the server middleware 612 identifies that the file is invalid when the characteristics of the file do not match the extension of the file.

In the foregoing embodiments, the first image processing apparatus fully receives the file, and then checks whether the file is valid. However, when a file size is relatively big, alternative embodiments are possible.

Figure 7:
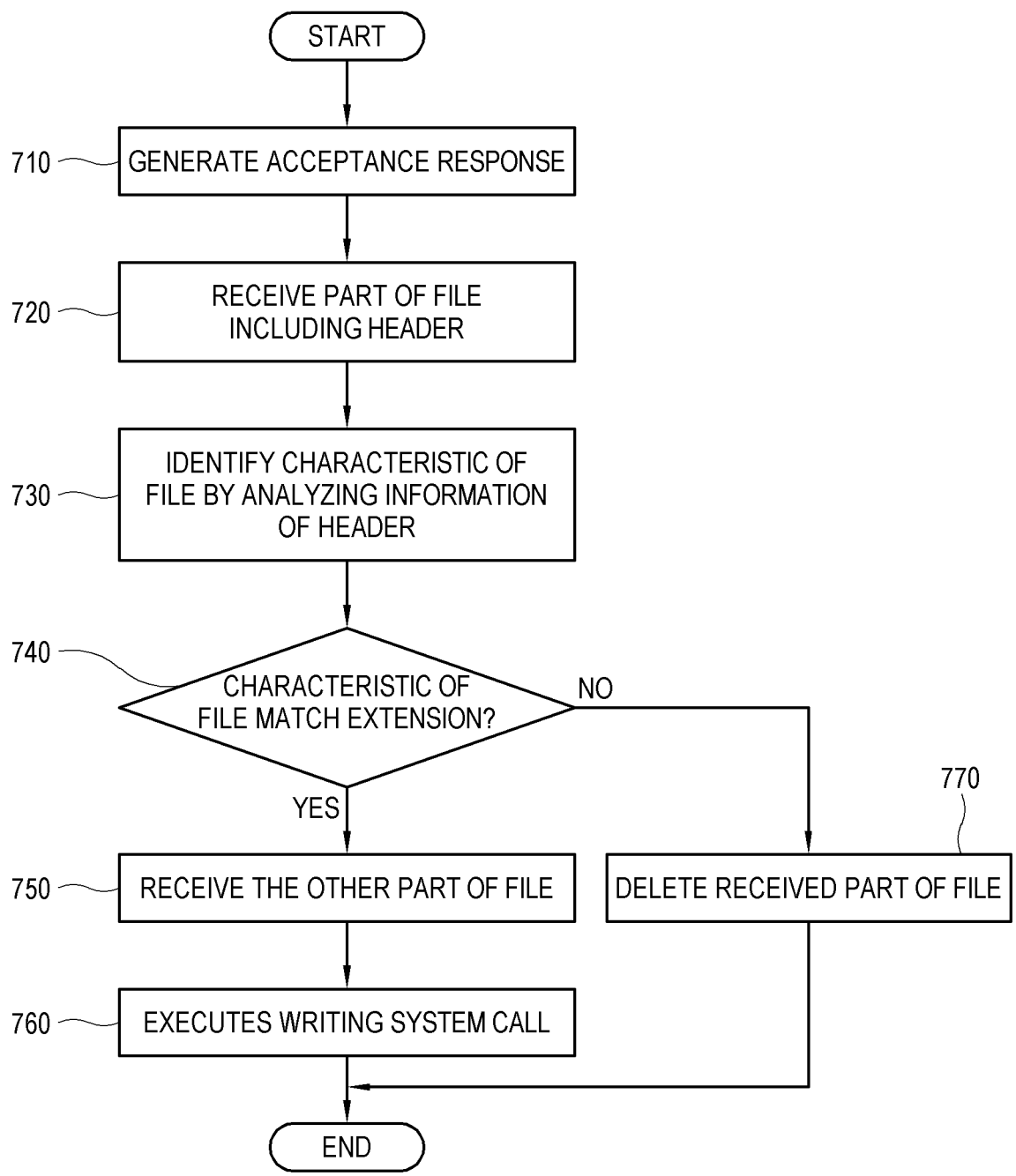
FIG. 7 is a flowchart showing a process where the first image processing apparatus according to an embodiment of the disclosure identifies validity of a file based on an approval response.

FIG. 7 is a flowchart showing a process where the first image processing apparatus according to an embodiment of the disclosure identifies validity of a file based on an approval response.

As shown in FIG. 7, when it is identified that the extension of the file is permitted in the preset standard, the first image processing apparatus generates an acceptance response and transmits the acceptance response to the second image processing apparatus at operation 710. The operation before generating the acceptance response is the same as described above, and thus repetitive descriptions thereof will be avoided.

At operation 720, the first image processing apparatus receives not the whole file but a part of the file including the header from the second image processing apparatus. Here, the received part of the file may include only the header except the body of the file, or may include the header and a partial body of the file.

At operation 730, the first image processing apparatus identifies the characteristics of the file by analyzing information of the received header. The characteristics of the file may for example include the format of the file.

At operation 740, the first image processing apparatus identifies whether the identified characteristics of the file match the extension of the file. For example, suppose that the extension of the file is 'lcs' as the extension of the file permitted in the standard and related to a license of content, but the analysis results of the information of the header shows that the file is not related to the license. In this case, it may be identified that the extension of the file is forged. Therefore, the first image processing apparatus identifies that the characteristics of the file does not match the extension of the file, and the file is invalid.

When it is identified that the characteristics of the file match the extension, at operation 750 the first image processing apparatus receives the other part of the file from the second image processing apparatus. When only the header of the file is received in the operation 720, the first image processing apparatus receives the body of the file in the operation 750. Alternatively, when the header and the partial body of the file are received in the operation 720, the first image processing apparatus receives the other body part of the file in the operation 750.

At operation 760, the first image processing apparatus executes the writing system call.

On the other hand, when it is identified that the characteristics of the file does not match the extension, at operation 770 the first image processing apparatus deletes the received part of the file.

Like this, the first image processing apparatus does not check the validity after fully receiving the file, but first receives only a part of the file necessary for the validity check and then receives the other part of the file after it is identified that the file is valid. Thus, it is possible to prevent the network from being used in wastefully receiving invalid file.

Meanwhile, the foregoing embodiment discloses the filtering routine of the first image processing apparatus performs the filtering operation to identify whether the extension of the file is permitted in the preset standard. Below, the filtering operation for the extension will be described in more detail.

Figure 8:
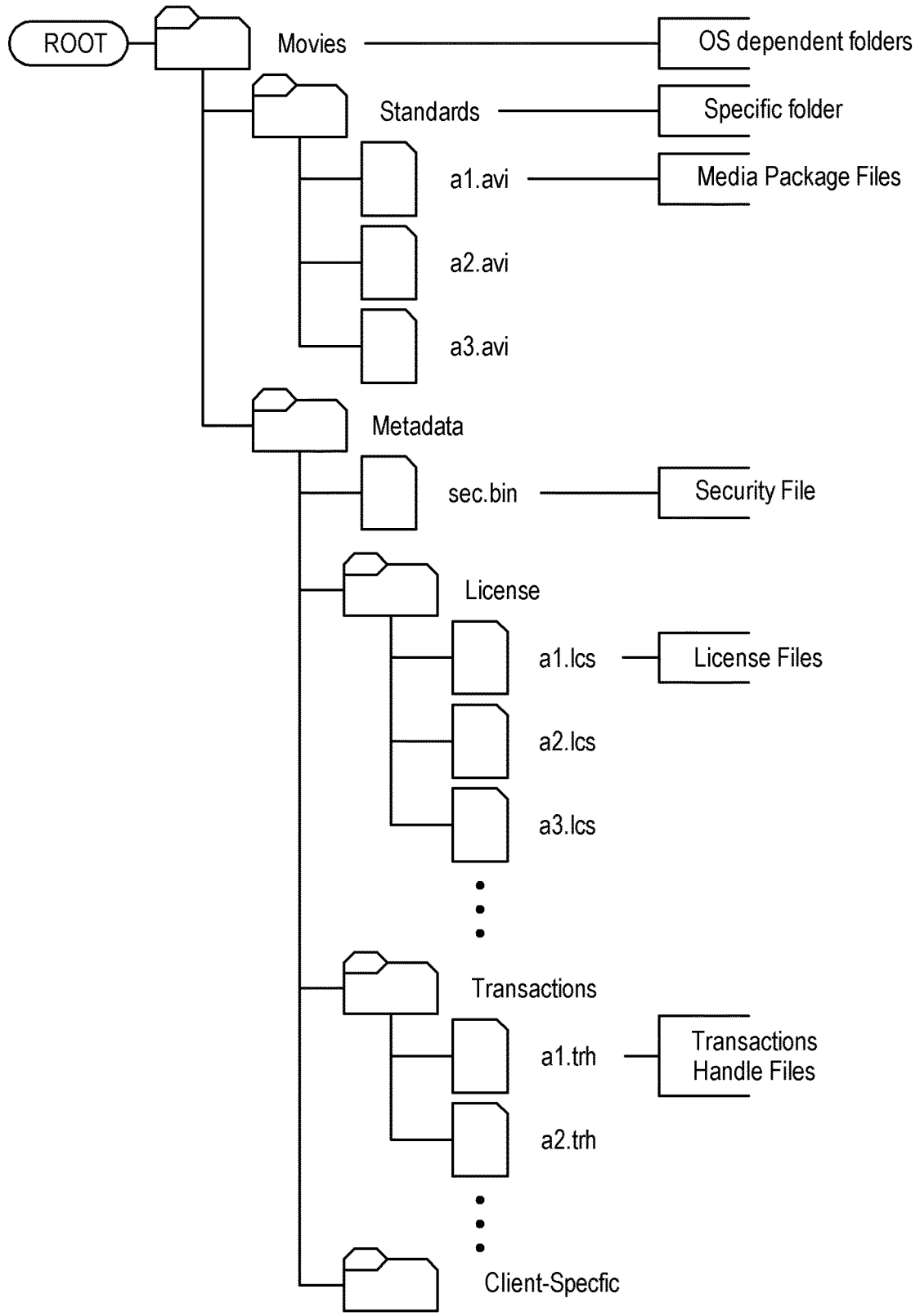
FIG. 8 illustrates an example of a file structure based on standards about sharing service for a file used in the first image processing apparatus according to an embodiment of the disclosure.

FIG. 8 illustrates an example of a file structure based on standards about sharing service for a file used in the first image processing apparatus according to an embodiment of the disclosure.

As shown in FIG. 8, the storage apparatus stores various files in a folder in accordance with predetermined standards for sharing the files.

By interaction between the first application executed in the first image processing apparatus and the second application executed in the second image processing apparatus, the file is transmitted from the first image processing apparatus to the second image processing apparatus. The first image processing apparatus and the second image processing apparatus may have their own independent file systems, and therefore the first application and the second application have a file system based on standards supported in common with each other for file transmission between the two apparatuses.

For example, the standards for file sharing service may be defined to give an extension of 'avi' to a multimedia package file, and give an extension of 'lcs' to a file related to authentication of the multimedia package file. Thus, the standards may previously define the extensions of the files according to purposes of use.

The file basically includes a filename and an extension. Because the filename may be variously set according to content and thus difficult to show the characteristic of the file, but the extension may be suitable for showing the characteristics of the file. Further, the analysis based on the extension is possible without receiving the file and thus advantageous in terms of security.

In the DB of the first image processing apparatus, the characteristics and extension of the file, permitted in the file sharing standards, are set. Based on the DB, the filtering routine easily identifies whether the file corresponding the writing request is permitted in the standards.

Below, the hardware configuration of the first image processing apparatus will be described according to an embodiment of the disclosure. The configuration of the second image processing apparatus is also equivalent to that of the first image processing apparatus.

Figure 9:
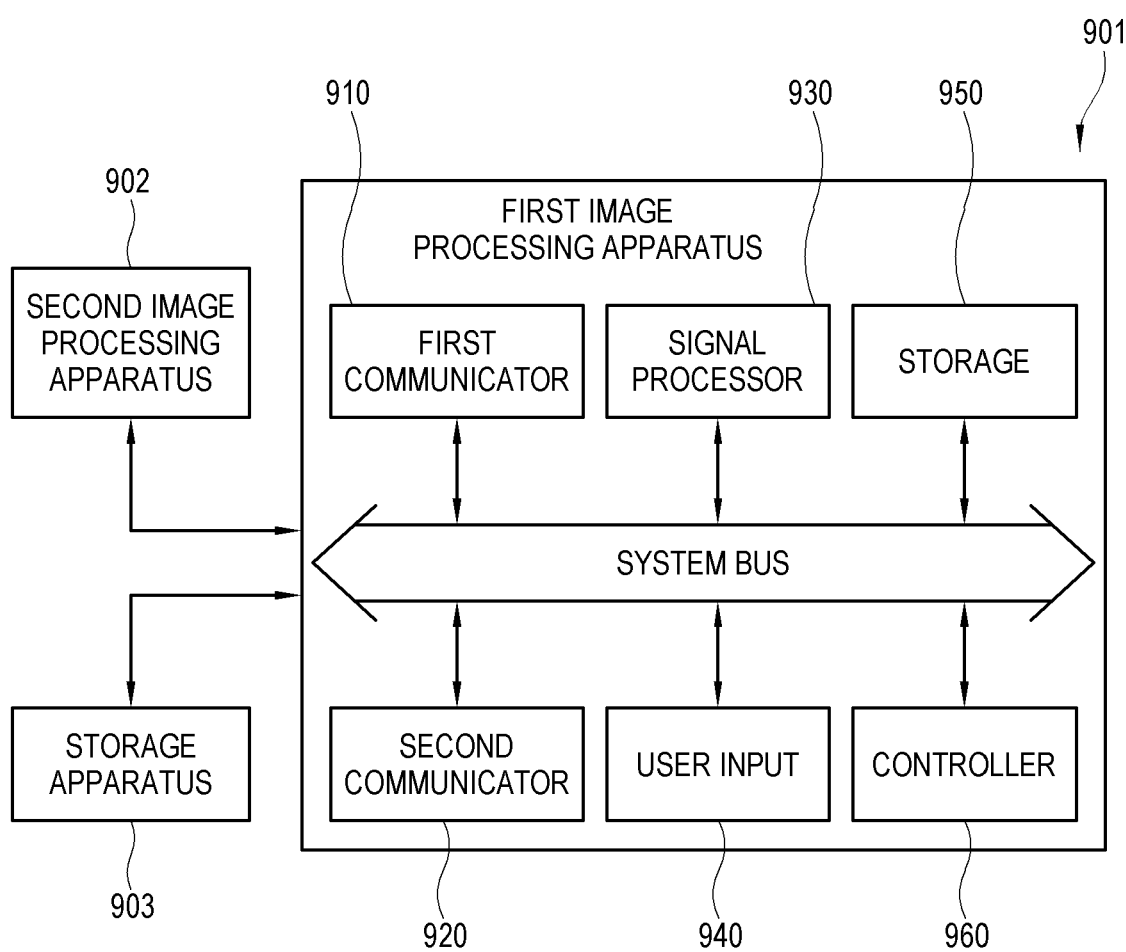
FIG. 9 is a block diagram of the first image processing apparatus according to an embodiment of the disclosure.

FIG. 9 is a block diagram of the first image processing apparatus according to an embodiment of the disclosure.

As shown in FIG. 9, a first image processing apparatus 901 according to this embodiment includes a first communicator 910 configured to communicate with a second image processing apparatus 902, a second communicator 920 configured to communicate with a storage apparatus 903, a signal processor 930 configured to process a signal, a user input 940 configured to allow a user to make an input, a storage 950 configured to store data, and a controller 960 configured to perform control for calculation for process of the signal processor 930 and general operation of the first image processing apparatus 901. These elements are connected to each other by a system bus. These elements are directly related to concept actualization of the disclosure in the first image processing apparatus 901, and descriptions about the other elements will be omitted.

The first communicator 910 is configured to perform direct or indirect communication with the second image processing apparatus 902 through the network according to preset standards. The first communicator 910 may for example include a communication circuit such as an Ethernet module for receiving packet data from the Internet through a wire, a wireless communication module for receiving the packet data wirelessly according to various standards such as Wi-Fi, Bluetooth, etc. and so on.

The second communicator 920 is configured to perform communication with the storage apparatus 903. The second communicator 920 may include a wired connection port such as a USB port to which the storage apparatus 903 is locally connected, or a communication circuit for performing communication with the storage apparatus 903 through the network according to the standards different from those for the first communicator 910.

The signal processor 930 is configured to process a signal by performing preset processes with regard to various signals such as a video signal. The signal processor 930 may process a video signal to be displayed as an image on the display, or process an audio signal to be output as a sound through a loudspeaker. The signal processor 930 includes a hardware processor, actualized as a chipset, a circuit, a buffer, etc., mounted on a printed circuit board, and may also be actualized by a system on chip (SOC).

The user input 940 transmits various preset control commands or information corresponding to a user's control or input to the controller 960. That is, the user input 940 outputs various events generated in accordance with a user's intention, so that the controller 960 can operate in response to the corresponding event. The user input 940 may be actualized in various forms according to the types of the first image processing apparatus 901, and may include a key provided in the main body of the first image processing apparatus 901, a remote controller separated from the main body the first image processing apparatus 901, or etc.

The storage 950 is configured to store various pieces of data under control of the controller 960. The storage 950 is accessed by the signal processor 930 or the controller 960 and performs reading, writing, modifying, deleting and updating the data. The storage 950 includes a flash memory in which data is retained regardless of whether the first image processing apparatus 901 is powered on or off, a nonvolatile memory such as a hard-disc drive (HDD), a solid-state drive (SSD), etc., and a volatile memory such as a buffer, a random access memory (RAM), etc. in which data processed by the signal processor 930 or the controller 960 is temporarily loaded.

The controller 960 is actualized by a CPU, a microprocessor, etc., controls operation of the elements in the first image processing apparatus 901, such as the signal processor 930, and performs the calculation of the process performed in the signal processor 930. For example, the operating system, the application, the middleware, etc. described in the foregoing embodiments may be executed by the signal processor 930 and the controller 960 as they are loaded into the RAM. The embodiments of the disclosure executed with this structure are the same as described above.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a volatile or nonvolatile storage such as a RAM, a ROM or the like, regardless of whether it is deletable or rewritable, for example, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

The invention claimed is:

1. An electronic apparatus comprising:
   at least one communicator configured to communicate with a first external apparatus and a second external apparatus; and
   a processor configured to:
      in response to receiving a request from the first external apparatus to transmit a first file stored in the second external apparatus, obtain the first file from the second external apparatus and transmit the first file to the first external apparatus,
      in response to receiving a request for writing a second file on the second external apparatus from the first external apparatus, identify whether a filename format of the second file is permitted to write on the second external apparatus based on information about the permitted filename format,
      based on identifying that the filename format of the second file is permitted, receive the second file from the first external apparatus, and control the second file to be stored in the second external apparatus, and
      based on identifying that the filename format of the second file is not permitted, prevent the second file being from stored in the second external apparatus,
   wherein the processor is further configured to perform a validity check of the second file, store the second file having passed the validity check in the second external apparatus, and delete the second file having failed to pass the validity check to not be stored in the second external apparatus, and
   wherein the processor is further configured to perform an analysis of a format of the second file based on a header of the second file, and identify a failure to pass the validity check based on a mismatch between a result of the analysis and an extension of the second file.

2. The electronic apparatus according to claim 1, wherein the processor is configured to receive the second file based on an extension of the second file, the writing of which is permitted, and prevent the second file from being received based on an extension of the second file, the writing of which is not permitted.

3. The electronic apparatus according to claim 2, further comprising a database to define extensions of which the writing is permitted,
wherein the processor is configured to identify whether the second file comprises the extension, the writing of which is permitted, by searching the database.

4. The electronic apparatus according to claim 1, wherein the processor is configured to:
receive a part of the second file comprising the header from the first external apparatus based on the filename format of the second file the writing of which is permitted,
perform the validity check of the second file based on the header,
receive another part of the second file from the first external apparatus based on the second file having passed the validity check, and
delete the received part of the second file based on the second file having failed to pass the validity check.

5. The electronic apparatus according to claim 1, wherein the processor is configured to selectively identify the filename format of the second file, based on whether an account of the first external apparatus has writing authority, in response to the request for writing with respect to the second file being received from the first external apparatus.

6. An electronic apparatus comprising:
at least one communicator configured to communicate with a first external apparatus and a second external apparatus; and
a processor configured to:
in response to receiving a request from the first external apparatus to transmit a first file stored in the second external apparatus, obtain the first file from the second external apparatus and transmit the first file to the first external apparatus,
in response to receiving a request for writing a second file on the second external apparatus from the first external apparatus, identify whether a filename format of the second file is permitted to write on the second external apparatus based on information about a permitted filename format,
based on identifying that the filename format of the second file is permitted, receive the second file from the first external apparatus, and control the second file to be stored in the second external apparatus, and
based on identifying that the filename format of the second file is not permitted, prevent the second file from being stored in the second external apparatus,
wherein the processor is further configured to transmit apparatus information about the first external apparatus to the first external apparatus, based on a broadcasting signal according to a transmission standard received from the first external apparatus through the at least one communicator, and process network communication according to the transmission standard to be enabled between the at least one communicator and the first external apparatus based on the apparatus information received from the first external apparatus.

7. A method of controlling an electronic apparatus, the method comprising:
communicating with a first external apparatus and a second external apparatus;
in response to receiving a request from the first external apparatus to transmit a first file stored in the second external apparatus, obtaining the first file from the second external apparatus and transmit the first file to the first external apparatus;
in response to receiving a request for writing a second file on the second external apparatus from the first external apparatus, identifying whether a filename format of the second file is permitted to write on the second external apparatus based on information about the permitted filename format;
based on identifying that the filename format of the second file is permitted, receiving the second file from the first external apparatus, and controlling the second file to be stored in the second external apparatus;
based on identifying that the filename format of the second file is not permitted, preventing the second file from being stored in the second external apparatus;
performing a validity check of the second file;
storing the second file having passed the validity check in the second external apparatus; and
deleting the second file having failed to pass the validity check to not be stored in the second external apparatus,
wherein the performing the validity check comprises analyzing a format of the second file based on a header of the second file, and identifying a failure to pass the validity check based on a mismatch between a result of the analyzing and an extension of the second file.

8. The method according to claim 7, wherein the receiving of the second file comprises receiving the second file based on an extension of the second file, the writing of which is permitted, and
the preventing comprises preventing the second file from being received based on an extension of the second file, the writing of which is not permitted.

9. The method according to claim 8, wherein the receiving of the second file comprises identifying whether the second file comprises the extension, the writing of which is permitted, by searching a database configured to define extensions of which the writing is permitted.

10. The method according to claim 7, wherein the receiving of the second file comprises:
receiving a part of the second file comprising the header from the first external apparatus based on the filename format of the second file the writing of which is permitted,
performing the validity check of the second file based on the header,
receiving another part of the second file from the first external apparatus based on the second file having passed the validity check, and
deleting the received part of the second file based on the second file having failed to pass the validity check.

* * * * *